(12) United States Patent
Ueda (10) Patent No.: US 8,971,021 B2
(45) Date of Patent: Mar. 3, 2015

(54) SOLID ELECTROLYTIC CAPACITOR AND METHOD FOR MANUFACTURING THE SAME

(75) Inventor: Masahiro Ueda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 200 days.

(21) Appl. No.: 13/339,729

(22) Filed: Dec. 29, 2011

(65) Prior Publication Data
US 2012/0182667 A1    Jul. 19, 2012

(30) Foreign Application Priority Data

Jan. 13, 2011 (JP) ................................. 2011-005073

(51) Int. Cl.
*H01G 9/00* (2006.01)
*H01G 9/028* (2006.01)
*H01G 9/15* (2006.01)

(52) U.S. Cl.
CPC . *H01G 9/028* (2013.01); *H01G 9/15* (2013.01)
USPC .......................................... 361/523; 361/525

(58) Field of Classification Search
None
See application file for complete search history.

(56) References Cited

U.S. PATENT DOCUMENTS

| 7,682,753 B2 * | 3/2010 | Koh et al. ...................... 429/316 |
| 2011/0122545 A1 * | 5/2011 | Yoshimitsu ................... 361/523 |

FOREIGN PATENT DOCUMENTS

| JP | 2008-218920 A | 9/2008 |
| JP | 2009-054925 A | 3/2009 |
| JP | 2010-157555 A | 7/2010 |

OTHER PUBLICATIONS

Office Action dated Aug. 26, 2014, issued in corresponding Japanese Patent Application No. 2011-005073, with English Translation (7 pages).

\* cited by examiner

*Primary Examiner* — Dion R Ferguson
(74) *Attorney, Agent, or Firm* — Westerman, Hattori, Daniels & Adrian, LLP (57) ABSTRACT

A solid electrolytic capacitor includes an anode body, a dielectric coating provided on a surface of the anode body, and a first conductive polymer layer provided on the anode body. The first conductive polymer layer includes a bis(perfluoroalkanesulfonyl)imide anion and an organic solvent having a boiling point of 240° C. or higher.

11 Claims, 5 Drawing Sheets

SOLID ELECTROLYTIC CAPACITOR AND METHOD FOR MANUFACTURING THE SAME

This nonprovisional application is based on Japanese Patent Application No. 2011-005073 filed on Jan. 13, 2011 with the Japan Patent Office, the entire contents of which are hereby incorporated by reference.

BACKGROUND OF THE INVENTION

1. Field of the Invention

The present invention relates to a solid electrolytic capacitor and a method for manufacturing the same.

2. Description of the Related Art

Solid electrolytic capacitors have been conventionally known as capacitors suitable for size reduction. Among the solid electrolytic capacitors, a solid electrolytic capacitor having a conductive polymer layer as a solid electrolyte has been widely used because the solid electrolytic capacitor has an advantage of being able to reduce the equivalent series resistance (referred to as "ESR" hereinafter) in accordance with the magnitude of the electrical conductivity of the conductive polymer layer.

The conductive polymer layer does not, however, have a capability to repair a damaged dielectric coating (dielectric coating repair capability). Therefore, the solid electrolytic capacitor having the conductive polymer layer tends to be lower in breakdown voltage capability than an electrolytic solution-type solid electrolytic capacitor.

As one technique for solving the above problem, a technique using an ionic liquid is expected. The ionic liquid refers to a salt melting and keeping the liquid state under an ordinary temperature environment, and has properties of nonvolatility and high ion conductivity. Japanese Patent Laying-Open No. 2008-218920, for example, discloses a technique of providing a conductive polymer layer with the dielectric coating repair capability by the presence of an ionic liquid between an anode body and the conductive polymer layer.

SUMMARY OF THE INVENTION

Since the ionic liquid itself tends to have low conductivity, the ESR of the solid electrolytic capacitor may become large. Therefore, even today, there is a need for development of a technique for providing a high-performance solid electrolytic capacitor having sufficiently low ESR and high breakdown voltage capability.

In light of the above circumstances, an object of the present invention is to provide a high-performance solid electrolytic capacitor and a method for manufacturing the same.

A first mode of the present invention is directed to a solid electrolytic capacitor, including: an anode body; a dielectric coating provided on a surface of the anode body; and a first conductive polymer layer provided on the anode body, wherein an anion expressed by a chemical formula (1) below and an organic solvent having a boiling point of 240° C. or higher are included in the first conductive polymer layer:

(1)

(in the chemical formula (1) above, $R^1$ and $R^2$ are identical with or different from each other, and represent a fluoroalkyl group.)

A second mode of the present invention is directed to a method for manufacturing a solid electrolytic capacitor, including the steps of: forming a first conductive polymer layer on an anode body having a dielectric coating on a surface thereof; and impregnating the first conductive polymer layer with an anion-containing solution, wherein the anion-containing solution is a solution obtained by dissolving an anion expressed by a chemical formula (1) below in an organic solvent having a boiling point of 240° C. or higher:

(1)

(in the chemical formula (1) above, $R^1$ and $R^2$ are identical with or different from each other, and represent a fluoroalkyl group.)

According to the present invention, there can be provided a high-performance solid electrolytic capacitor and a method for manufacturing the same.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of a solid electrolytic capacitor according to the present invention will be described hereinafter with reference to the drawings. The following embodiments are one example and various embodiments can be implemented within the scope of the present invention. In the drawings of the present invention, the same reference characters indicate the same or corresponding portions.

First Embodiment

Solid Electrolytic Capacitor

Figure 1:
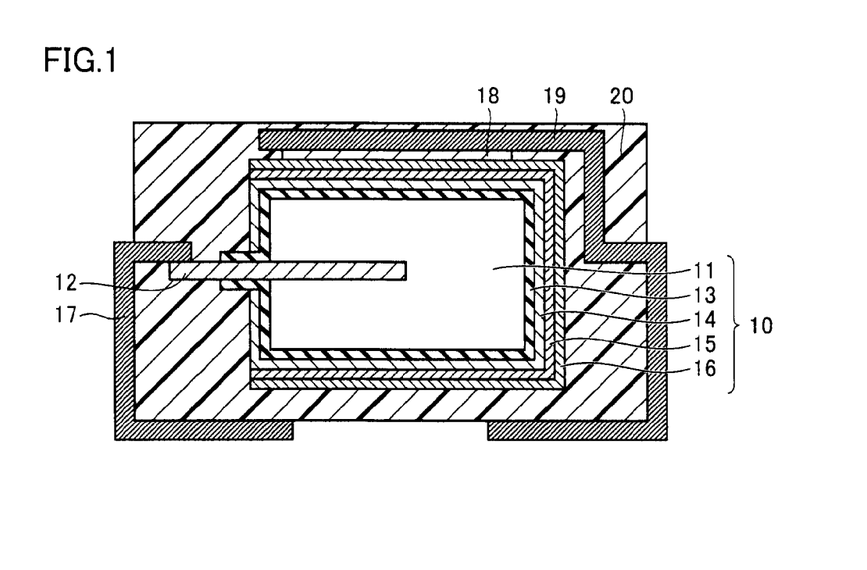
FIG. 1 is a schematic cross-sectional view of a solid electrolytic capacitor according to an embodiment of the present invention.

As shown in FIG. 1, a solid electrolytic capacitor includes an anode body 11 having an anode lead 12 provided in an upright manner, a dielectric coating 13 provided on a surface of anode body 11, and a first conductive polymer layer 14 provided on dielectric coating 13. In addition, a cathode layer obtained by stacking a carbon layer 15 and a silver paint layer 16 in this order is provided on first conductive polymer layer 14. Anode body 11, anode lead 12, dielectric coating 13, first conductive polymer layer 14, carbon layer 15, and silver paint layer 16 constitute a capacitor element 10.

An anode terminal 17 is connected to anode lead 12, and a cathode terminal 19 is connected to silver paint layer 16 with a bonding layer 18 of a conductive adhesive interposed therebetween. Capacitor element 10 is sealed with an exterior resin 20 such that a part of anode terminal 17 and a part of cathode terminal 19 are exposed. It is to be noted that anode terminal 17 and cathode terminal 19 exposed from exterior resin 20 are bent along a surface of exterior resin 20 in FIG. 1.

A material of anode body 11 is not particularly limited and may only have conductivity. Suitably, anode body 11 is made of a valve-acting metal such as tantalum, niobium, titanium, or aluminum. Anode body 11 is preferably a sintered compact. A material of anode lead 12 is not particularly limited as long as anode lead 12 is made of a metal. Suitably, however, anode lead 12 is made of the valve-acting metal.

A material of dielectric coating 13 is not particularly limited and may only have a dielectric property. Suitably, dielectric coating 13 is made of a metal oxide formed by chemical conversion treatment of anode body 11 made of the valve-acting metal. For example, when dielectric coating 13 is formed by chemical conversion treatment of tantalum (Ta) used as the material of anode body 11, dielectric coating 13 is made of $Ta_2O_5$. When dielectric coating 13 is formed by chemical conversion treatment of aluminum (Al) used as the material of anode body 11, dielectric coating 13 is made of $Al_2O_3$.

First conductive polymer layer 14 is preferably formed of a polymer including at least one of an aliphatic compound, an aromatic compound, a heterocyclic compound, and a heteroatom-containing compound. First conductive polymer layer 14 may be formed of, for example, polythiophene or derivatives thereof, polypyrrole or derivatives thereof, polyaniline or derivatives thereof, or polyfuran or derivatives thereof. First conductive polymer layer 14 is preferably formed of polypyrrole or derivatives thereof An anion expressed by a chemical formula (1) below and an organic solvent having a boiling point of 240° C. or higher are included in above-mentioned first conductive polymer layer 14.

(1)

The anion expressed by the chemical formula (1) above is a bis(perfluoroalkanesulfonyl)imide anion (referred to as "Pf anion" hereinafter). Specific examples of the Pf anion include a bis(trifluoromethanesulfonyl)imide anion, a bis(pentafluoroethanesulfonyl)imide anion, pentafluoroethanesulfonyl trifluoromethanesulfonyl imide, trifluoromethanesulfonyl heptafluoropropanesulfonyl imide, nonafluorobutanesulfonyl trifluoromethanesulfonyl imide or the like. One or a plurality of the above Pf anions may be included in first conductive polymer layer 14. Preferably, however, the bis(trifluoromethanesulfonyl)imide anion is included in first conductive polymer layer 14.

The organic solvent having a boiling point of 240° C. or higher (referred to as "high-boiling-point organic solvent" hereinafter) includes, for example, propylene carbonate (boiling point: 240° C.), ethylene glycol monophenyl ether (boiling point: 242° C.), triethylene glycol monomethyl ether (boiling point: 249° C.), triethylene glycol monoethyl ether (boiling point: 255° C.), diethylene glycol dibutyl ether (boiling point: 256° C.), triethylene glycol butyl methyl ether (boiling point: 261° C.), polyethylene glycol dimethyl ether (boiling point: 264° C.), tetraethylene glycol dimethyl ether (boiling point: 275° C.), 2,2'-thiodiethanol (boiling point: 282° C.), sulfolane (boiling point: 285° C.), polyethylene glycol monomethyl ether (boiling point: 290° C.) or the like. One or a plurality of the above high-boiling-point organic solvents may be included in first conductive polymer layer 14.

As a result of earnest study, the inventor of the present invention found that the breakdown voltage capability of the solid electrolytic capacitor can be enhanced while keeping the ESR of the solid electrolytic capacitor sufficiently low because the above Pf anion and the above high-boiling-point organic solvent are included in first conductive polymer layer 14. This is probably because the Pf anion has high conductivity and a function of repairing dielectric coating 13, and the high-boiling-point organic solvent is stably present in the solid electrolytic capacitor.

In other words, since the Pf anion and the high-boiling-point organic solvent are included in first conductive polymer layer 14, the Pf anion can be present in first conductive polymer layer 14 in a state where the Pf anion is dissolved in the high-boiling-point organic solvent. As a result, the Pf anion can move within first conductive polymer layer 14. In addition, since the high-boiling-point organic solvent is stably present in the solid electrolytic capacitor, the Pf anion dissolved in the high-boiling-point organic solvent can also be stably present in first conductive polymer layer 14. Therefore, the Pf anion can enhance the breakdown voltage capability of the solid electrolytic capacitor. The Pf anion can also suppress an increase in the ESR, and thus, the Pf anion can keep the ESR sufficiently low.

The solid electrolytic capacitor is usually mounted on a circuit board by soldering and the temperature at the time of soldering is 230 to 250° C., which is high. In the case where commonly used water or a low-boiling-point organic solvent such as alcohol is included in first conductive polymer layer 14 instead of the high-boiling-point organic solvent, for example, the water or the low-boiling-point organic solvent may vaporize in first conductive polymer layer 14 by heat applied to the solid electrolytic capacitor during soldering. In this case, dielectric coating 13 or first conductive polymer layer 14 are damaged due to, for example, an increase in the internal pressure of the capacitor element caused by vaporization. When the water or the organic solvent vaporizes in first conductive polymer layer 14 in the case where the water or the low-boiling-point organic solvent such as alcohol is included in first conductive polymer layer 14 instead of the high-boiling-point organic solvent, movement of the Pf anion within first conductive polymer layer 14 becomes difficult and the function of repairing dielectric coating 13 by the Pf anion declines.

In contrast, in the case where the Pf anion and the high-boiling-point organic solvent are included in first conductive polymer layer 14, the above-mentioned problems do not arise, and thus, the function of repairing dielectric coating 13 by the Pf anion can be sufficiently achieved in the solid electrolytic capacitor after mounting as well.

It is to be noted that inclusion of the Pf anion in first conductive polymer layer 14 can be checked using various types of devices. When a nuclear magnetic resonance spectroscopic method is used, for example, it can be checked whether the Pf anion is included or not, by taking a part of first conductive polymer layer 14, using an appropriate solvent to extract the Pf anion in each sample into the solvent, and detecting a spectrum unique to the Pf anion, e.g., a fluoroalkyl group, by a nuclear magnetic resonance spectrometer.

In first conductive polymer layer 14, the concentration of the Pf anion dissolved in the high-boiling-point organic solvent is preferably 1% or higher. In this case, the function of the Pf anion can be efficiently achieved. The Pf anion may also be saturated in the high-boiling-point organic solvent. More preferably, the concentration of the Pf anion dissolved in the high-boiling-point organic solvent is 5% or higher and 25% or lower. In this case, the function of the Pf anion can be achieved more efficiently and the performance of the solid electrolytic capacitor can be further enhanced. It is to be noted that a value of the concentration (%) of the Pf anion dissolved in the high-boiling-point organic solvent is obtained by dividing the mass (g) of the Pf anion by the mass (g) of the high-boiling-point organic solvent to obtain a value and multiplying the value by 100.

A dopant may be provided to first conductive polymer layer 14. A type of the dopant is not particularly limited and the dopant may be, for example, an acid or a salt of a sulfonic acid compound such as alkyl sulfonic acid, aromatic sulfonic acid or polycyclic aromatic sulfonic acid, or may be sulfuric acid, nitric acid or the like. When the basic skeleton of the polymer is polythiophene, higher conductivity of first conductive polymer layer 14 can be achieved by using aromatic sulfonic acid, and in particular p-toluenesulfonic acid as the dopant.

A material of carbon layer 15 may only have conductivity and carbon layer 15 may be made of, for example, graphite. Silver paint layer 16 may only be made of silver particles. Each material of anode terminal 17 and cathode terminal 19 may only have conductivity, and anode terminal 17 and cathode terminal 19 may be made of a metal such as, for example, copper. Bonding layer 18 may only have conductivity and adhesiveness, and bonding layer 18 may be made of a silver adhesive including silver as a filler, for example. A material of exterior resin 20 is not particularly limited and may be a known resin such as, for example, an epoxy resin.

<<Method for Manufacturing Solid Electrolytic Capacitor>>

One example of a method for manufacturing the solid electrolytic capacitor according to the first embodiment will be described hereinafter with reference to FIGS. 1 to 3D.

(Step of Forming Anode Body)

Figure 2:
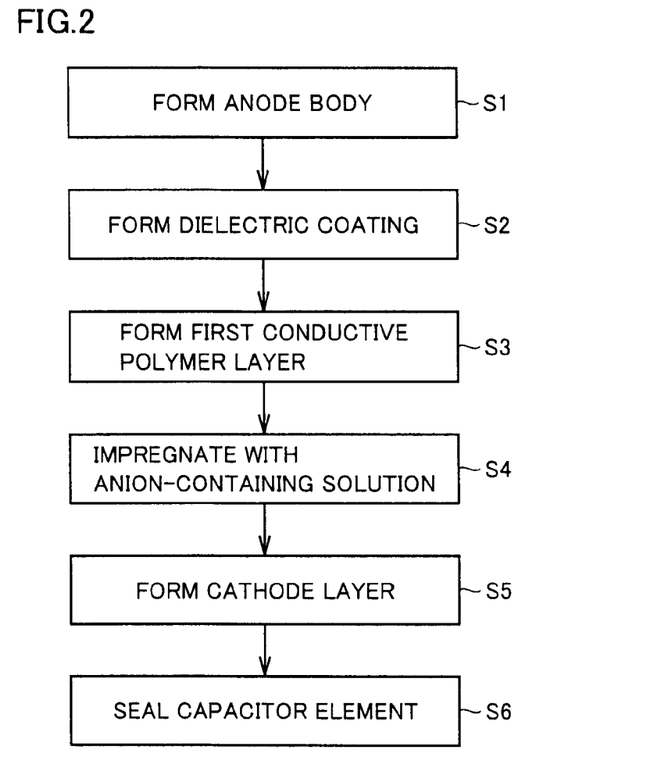
FIG. 2 is a flowchart of a method for manufacturing the solid electrolytic capacitor according to the embodiment of the present invention.
Figure 3A:
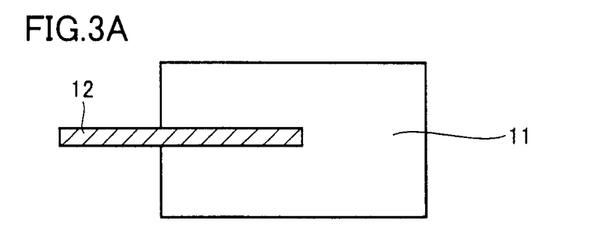
FIGS. 3A to 3D are schematic cross-sectional views showing the method for manufacturing the solid electrolytic capacitor according to the embodiment of the present invention in the order of steps.

First, in step S1 in FIG. 2, anode body 11 is formed as shown in FIG. 3A. For example, metal powder is prepared and the powder is molded into a desired shape, with one end side of rod-shaped anode lead 12 in the longitudinal direction buried into the metal powder. Next, this molded body is sintered to form porous anode body 11 having one end of anode lead 12 embedded therein.

A material of anode body 11 is not particularly limited. However, from the viewpoint of easy formation of dielectric coating 13, anode body 11 is preferably made of the valve-acting metal such as aluminum, tantalum or niobium. A material of anode lead 12 is not particularly limited, either. However, from the similar viewpoint to anode body 11, anode lead 12 is preferably made of the valve-acting metal.

(Step of Forming Dielectric Coating)

Figure 3B:
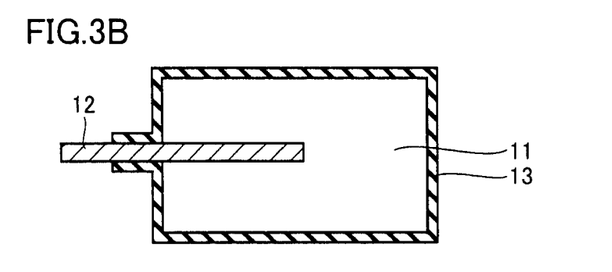

Next, in step S2 in FIG. 2, dielectric coating 13 is formed on a surface of anode body 11 as shown in FIG. 3B. A method for forming dielectric coating 13 is not particularly limited. When anode body 11 is made of the valve-acting metal, for example, dielectric coating 13 can be formed on the surface of anode body 11 by chemical conversion treatment of anode body 11. For example, as the chemical conversion treatment, anode body 11 may be soaked in a conversion solution such as a phosphoric acid aqueous solution or a nitric acid aqueous solution and may be subjected to heat treatment, or anode body 11 may be soaked in the conversion solution and a voltage may be applied. Through this step, the surface of anode body 11 can be changed into dielectric coating 13. Through the above-mentioned steps, anode body 11 having dielectric coating 13 on the surface thereof is prepared.

(Step of Forming First Conductive Polymer Layer)

Figure 3C:
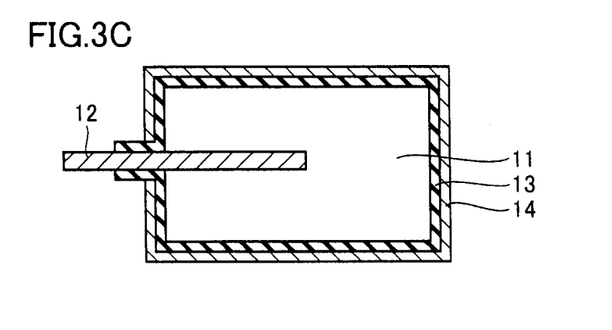

Next, in step S3 in FIG. 2, first conductive polymer layer 14 is formed on anode body 11 having dielectric coating 13 on the surface thereof as shown in FIG. 3C. First conductive polymer layer 14 can be formed using a chemical polymerization method or an electrolytic polymerization method. From the viewpoints of easy formation onto dielectric coating 13 and easy impregnation with an anion-containing solution as described below because the conductive polymer layer obtained by chemical polymerization has a relatively coarse structure, first conductive polymer layer 14 is preferably formed using the chemical polymerization method.

For example, as a method for forming first conductive polymer layer 14 by chemical polymerization, there is a method for exposing anode body 11 having an oxidant and a dopant adhered onto dielectric coating 13 to gas including a precursor monomer of the polymer forming first conductive polymer layer 14. For example, as a method for adhering the oxidant and the dopant to anode body 11, anode body 11 may be soaked in a solution including the oxidant and the dopant, or anode body 11 may be soaked in each of a solution including the oxidant and a solution including the dopant, or a solution including the oxidant and a solution including the dopant may be applied to anode body 11.

Although the above-mentioned method is gas-phase polymerization among chemical polymerization, first conductive polymer layer 14 may be formed by liquid-phase polymerization. For example, anode body 11 having dielectric coating 13 formed thereon may be soaked in a solution including the precursor monomer of the polymer forming first conductive polymer layer 14, the oxidant and the dopant to oxidatively polymerize the precursor monomer on dielectric coating 13. The precursor monomer, the oxidant and the dopant do not always have to be included in one solution, and each may be included in a different solution. When oxidation polymerization is performed using two or more solutions, the order of soaking in each solution is not particularly limited.

The precursor monomer refers to a compound changing into any one of polythiophene and derivatives thereof, polypyrrole and derivatives thereof, polyaniline and derivatives thereof, and polyfuran and derivatives thereof as a result of polymerization. For example, 3,4-ethylenedioxythiophene, 3-alkylthiophene, N-methylpyrrole, N,N-dimethylaniline, N-alkylaniline or the like can be used as the precursor monomer.

The oxidant may only allow polymerization of the precursor monomer, and may be, for example, sulfuric acid, hydrogen peroxide, iron (III), copper (II), chromium (VI), cerium (IV), manganese (VII), zinc (II) or the like. In particular, an aromatic sulfonic acid metal salt including one or more of these metals as cation is suitable because the aromatic sulfonic acid metal salt has a function as the dopant in addition to a function as the oxidant. A naphthalene sulfonic acid metal salt, a tetralin sulfonic acid metal salt, an alkylbenzene sulfonic acid metal salt, or an alkoxybenzene sulfonic acid metal salt can, for example, be used as the aromatic sulfonic acid metal salt.

As the dopant, an acid or a salt of a sulfonic acid compound such as alkyl sulfonic acid, aromatic sulfonic acid or polycyclic aromatic sulfonic acid may, for example, be used, or sulfuric acid, nitric acid or the like may be used. As described above, the aromatic sulfonic acid metal salt having the function as the oxidant and the function as the dopant can be used.

(Step of Impregnation with Anion-Containing Solution)

Next, in step S4 in FIG. 2, first conductive polymer layer 14 is impregnated with the anion-containing solution. A method for impregnating first conductive polymer layer 14 with the anion-containing solution is not particularly limited. For example, anode body 11 having first conductive polymer layer 14 fanned thereon may be soaked in the anion-containing solution.

The anion-containing solution is obtained by dissolving the above-mentioned Pf anion in the above-mentioned high-boiling-point organic solvent. The anion-containing solution can be prepared, for example, by adding a salt formed of the Pf anion and a cation to the high-boiling-point organic solvent. The cation is not particularly limited. As the cation, lithium, sodium, potassium, rubidium, cesium, francium, ammonia or the like may, for example, be used, or alkylammonium such as tetramethylammonium or tetraethylammonium, or the like may be used. It is to be noted that the salt formed of the Pf anion and the cation is in the solid state at ordinary temperature (approximately 25° C.).

The concentration of the salt, that is, the concentration of the Pf anion in the anion-containing solution is preferably 1% or higher. As a result, the function of repairing dielectric coating 13 by the Pf anion permeating first conductive polymer layer 14 is efficiently achieved. The concentration of the Pf anion is preferably 5% or higher and 25% or lower. As a result, the Pf anion can be present efficiently in first conductive polymer layer 14. In addition, since the viscosity of the anion-containing solution can be kept sufficiently low, excellent permeability of the Pf anion through first conductive polymer layer 14 and high mobility of the Pf anion in first conductive polymer layer 14 are achieved.

If a time during which first conductive polymer layer 14 is impregnated with the anion-containing solution (soaking time) is one minute or longer, the anion-containing solution can sufficiently permeate first conductive polymer layer 14. From the viewpoint of takt time, the soaking time is preferably 60 minutes or shorter. More preferably, the soaking time is 5 minutes or longer and 10 minutes or shorter. As a result, the permeability of the Pf anion through first conductive polymer layer 14 and the takt time can be designed more appropriately.

(Step of Forming Cathode Layer)

Figure 3D:
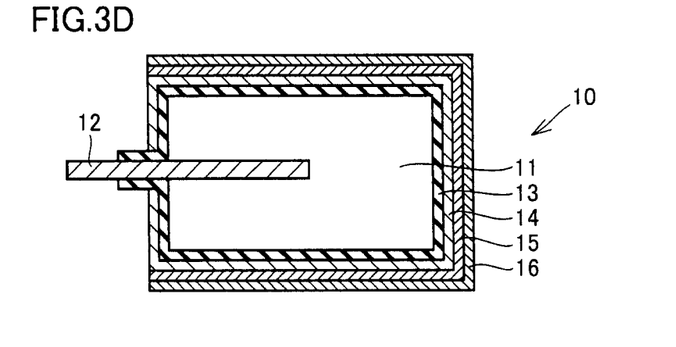

Next, in step S5 in FIG. 2, carbon layer 15 and silver paint layer 16 are formed on first conductive polymer layer 14 as shown in FIG. 3D.

A method for forming each of carbon layer 15 and silver paint layer 16 is not particularly limited. Carbon layer 15 can be formed, for example, by soaking anode body 11 having first conductive polymer layer 14 formed thereon in a solution in which carbon particles are dispersed, and thereafter, performing dry treatment. Silver paint layer 16 can be formed by soaking anode body 11 in a solution including silver particles and performing dry treatment after formation of carbon layer 15. Through the above-mentioned steps, capacitor element 10 is fabricated.

(Step of Sealing Capacitor Element)

Next, in step S6 in FIG. 2, capacitor element 10 is sealed to manufacture the solid electrolytic capacitor as shown in FIG. 1. Although a method for sealing is not particularly limited, there is a method as described below, for example.

Specifically, first, anode terminal 17 is connected to an exposed end of anode lead 12. Bonding layer 18 is formed on silver paint layer 16 and one end of cathode terminal 19 is connected to bonding layer 18. Next, capacitor element 10 is sealed with exterior resin 20 such that the other end of each of anode terminal 17 and cathode terminal 19 is exposed. Finally, anode terminal 17 and cathode terminal 19 exposed from exterior resin 20 are bent along exterior resin 20 and aging treatment is performed. The solid electrolytic capacitor shown in FIG. 1 is thus manufactured.

In the method for manufacturing the solid electrolytic capacitor according to the first embodiment as described above, the solid electrolytic capacitor in which the Pf anion and the organic solvent are included in first conductive polymer layer 14 can be manufactured. Since the Pf anion and the organic solvent are included in first conductive polymer layer 14, the Pf anion can be stably present in first conductive polymer layer 14 and the Pf anion can easily move within first conductive polymer layer 14.

Therefore, in the method for manufacturing the solid electrolytic capacitor according to the first embodiment, the solid electrolytic capacitor that allows efficient repair of dielectric coating 13 by the Pf anion and allows the ESR to be kept low can be manufactured. In addition, in the solid electrolytic capacitor according to the first embodiment, since damage of dielectric coating 13 is efficiently repaired by the Pf anion and the Pf anion has conductivity, a decline in the breakdown voltage capability can be suppressed. In other words, there can be provided a high-performance solid electrolytic capacitor.

The high-boiling-point organic solvent is stably present in first conductive polymer layer 14. Therefore, even when the solid electrolytic capacitor is mounted on the circuit board by soldering, for example, the Pf anion can be stably present in first conductive polymer layer 14. Therefore, the solid electrolytic capacitor according to the first embodiment can maintain a sufficiently high performance even after mounting.

Second Embodiment

Solid Electrolytic Capacitor

Figure 4:
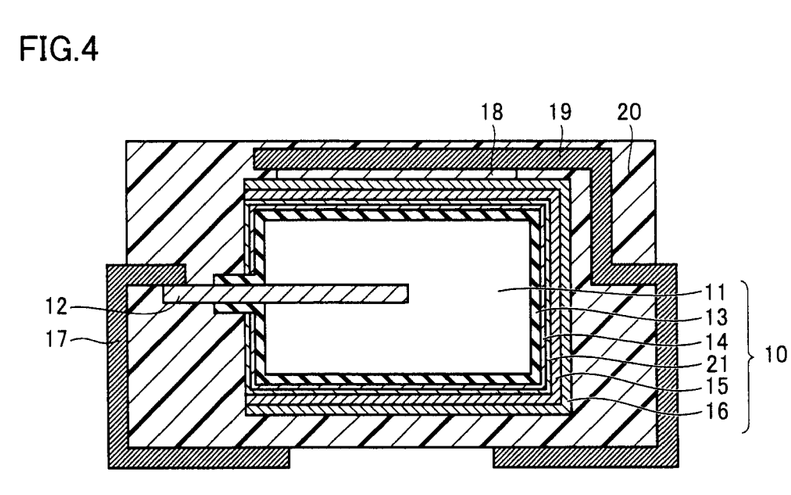
FIG. 4 is a schematic cross-sectional view of a solid electrolytic capacitor according to an other embodiment of the present invention.

As shown in FIG. 4, a solid electrolytic capacitor includes anode body 11 having anode lead 12 provided in an upright manner, dielectric coating 13 provided on the surface of anode body 11, first conductive polymer layer 14 provided on dielectric coating 13, and a second conductive polymer layer 21 provided on first conductive polymer layer 14. A cathode layer obtained by stacking carbon layer 15 and silver paint layer 16 in this order is provided on second conductive polymer layer 21. Anode body 11, anode lead 12, dielectric coating 13, first conductive polymer layer 14, second conductive polymer layer 21, carbon layer 15, and silver paint layer 16 constitute capacitor element 10.

A polymer forming second conductive polymer layer 21 is similar to the polymer forming first conductive polymer layer 14. A dopant may be provided to second conductive polymer layer 21. A type of the dopant is not particularly limited and the dopant that can be provided to first conductive polymer layer 14 can, for example, be used. It is to be noted that the Pf anion and the high-boiling-point organic solvent may also be included in second conductive polymer layer 21.

In the solid electrolytic capacitor according to the second embodiment, a description other than the above is similar to that of the first embodiment, and thus, the description will not be repeated.

<<Method for Manufacturing Solid Electrolytic Capacitor>>

One example of a method for manufacturing the solid electrolytic capacitor according to the second embodiment will be described hereinafter with reference to FIGS. 4 to 6E.

(Step of Forming Anode Body)

Figure 5:
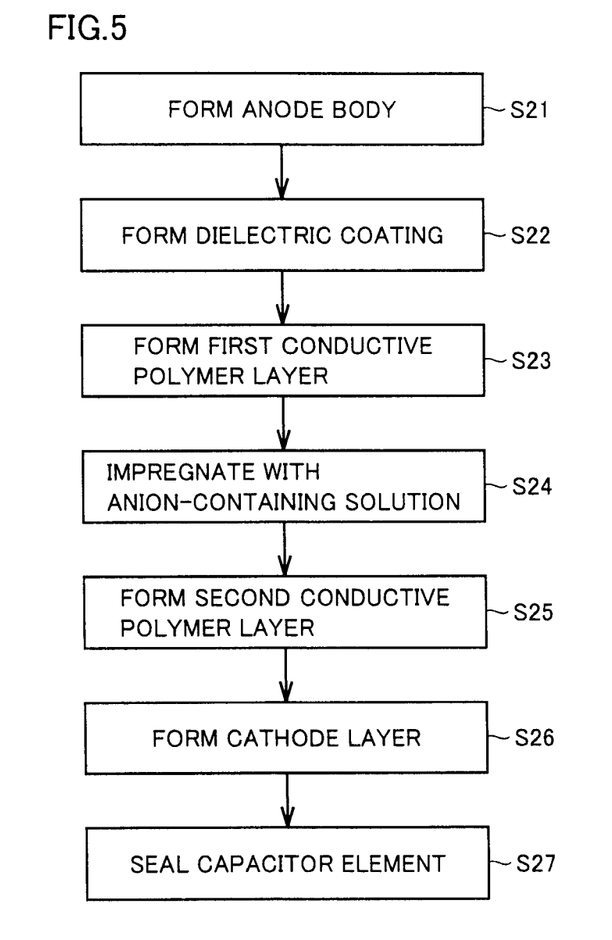
FIG. 5 is a flowchart of a method for manufacturing the solid electrolytic capacitor according to the other embodiment of the present invention.
Figure 6A:
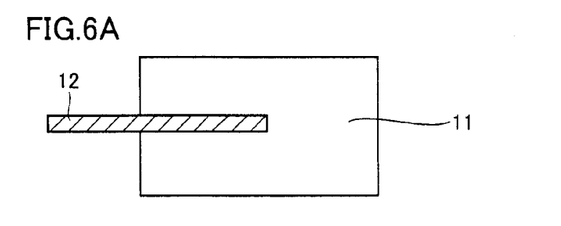
FIGS. 6A to 6E are schematic cross-sectional views showing the method for manufacturing the solid electrolytic capacitor according to the other embodiment of the present invention in the order of steps.

First, in step S21 in FIG. 5, anode body 11 is formed as shown in FIG. 6A. A method for forming anode body 11 is similar to that in the first embodiment, and thus, a description thereof will not be repeated.

(Step of Forming Dielectric Coating)

Figure 6B:
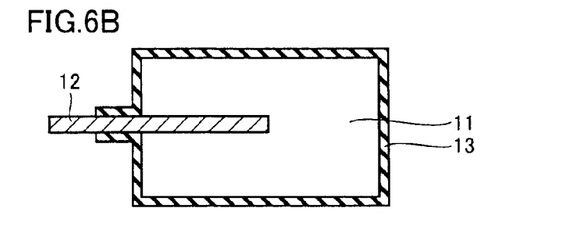

Next, in step S22 in FIG. 5, dielectric coating 13 is formed on the surface of anode body 11 as shown in FIG. 6B. A method for forming dielectric coating 13 is similar to that in the first embodiment, and thus, a description thereof will not be repeated. Through the above-mentioned steps, anode body 11 having dielectric coating 13 on the surface thereof is prepared.

(Step of Forming First Conductive Polymer Layer)

Figure 6C:
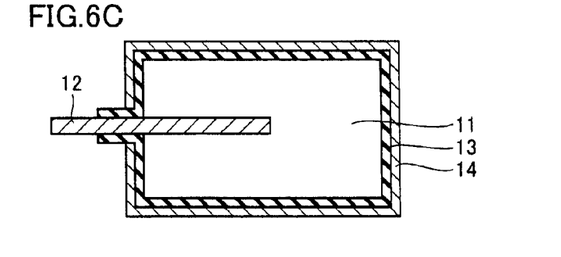

Next, in step S23 in FIG. 5, first conductive polymer layer 14 is formed on anode body 11 having dielectric coating 13 on the surface thereof as shown in FIG. 6C. A method for forming first conductive polymer layer 14 is similar to that in the first embodiment, and thus, a description thereof will not be repeated.

(Step of Impregnation with Anion-Containing Solution)

Next, in step S24 in FIG. 5, first conductive polymer layer 14 is impregnated with the anion-containing solution. A method for impregnation with the anion-containing solution is similar to that in the first embodiment, and thus, a description thereof will not be repeated.

(Step of Forming Second Conductive Polymer Layer)

Figure 6D:
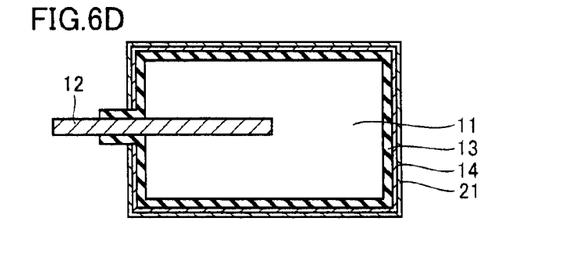

Next, in step S25 in FIG. 5, second conductive polymer layer 21 is formed on first conductive polymer layer 14 as shown in FIG. 6D. Although second conductive polymer layer 21 can be formed using the chemical polymerization method or the electrolytic polymerization method, formation using the electrolytic polymerization method is preferable. The reason for this is as described below.

Specifically, the structure of a conductive polymer layer formed using the electrolytic polymerization method is more dense than the structure of a conductive polymer layer formed using the chemical polymerization method. Therefore, when second conductive polymer layer 21 is formed using the electrolytic polymerization method, there is a tendency for the anion-containing solution included in first conductive polymer layer 14 not to easily move into second conductive polymer layer 21 formed using the electrolytic polymerization method. As a result, the anion-containing solution can be kept in first conductive polymer layer 14 located near dielectric coating 13, and thus, the function of repairing dielectric coating 13 by the Pf anion can be achieved more effectively.

For example, as a method for forming second conductive polymer layer 21 by electrolytic polymerization, anode body 11 may be soaked in an electrolytic solution including a precursor monomer of second conductive polymer layer 21 and the dopant, and a current may be passed through this electrolytic solution.

(Step of Forming Cathode Layer)

Figure 6E:
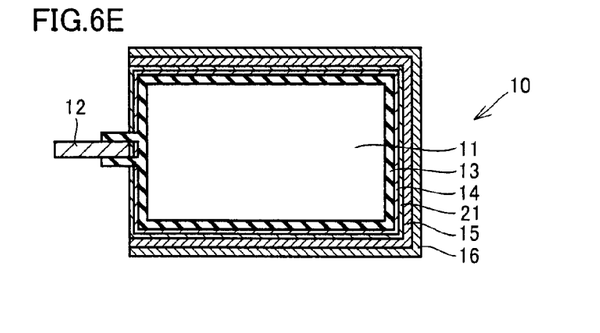

Next, in step S26 in FIG. 5, carbon layer 15 and silver paint layer 16 are formed on second conductive polymer layer 21 as shown in FIG. 6E. A method for forming the cathode layer is similar to that in the first embodiment, and thus, a description thereof will not be repeated.

(Step of Sealing Capacitor Element)

Next, in step S27 in FIG. 5, capacitor element 10 is sealed to manufacture the solid electrolytic capacitor as shown in FIG. 4. A method for sealing capacitor element 10 is similar to that in the first embodiment, and thus, a description thereof will not be repeated.

In the method for manufacturing the solid electrolytic capacitor according to the second embodiment as described above, the solid electrolytic capacitor in which the Pf anion and the organic solvent are included in first conductive polymer layer 14 can be manufactured. Since the Pf anion and the organic solvent are included in first conductive polymer layer 14, the Pf anion can be stably present in first conductive polymer layer 14 and the Pf anion can easily move within first conductive polymer layer 14.

Therefore, in the method for manufacturing the solid electrolytic capacitor according to the second embodiment, the solid electrolytic capacitor that allows efficient repair of dielectric coating 13 by the Pf anion and allows the ESR to be kept low can be manufactured. In the solid electrolytic capacitor according to the second embodiment, since damage of dielectric coating 13 is efficiently repaired by the Pf anion and the Pf anion has conductivity, a decline in the breakdown voltage capability can be suppressed. In other words, there can be provided a high-performance solid electrolytic capacitor.

In the method for manufacturing the solid electrolytic capacitor according to the second embodiment, it is preferable to form first conductive polymer layer 14 using the chemical polymerization method and to form second conductive polymer layer 21 using the electrolytic polymerization method. As a result, the solid electrolytic capacitor including first conductive polymer layer 14 having a relatively sparse structure and second conductive polymer layer 21 having a relatively dense structure can be fabricated.

When second conductive polymer layer 21 is more dense than first conductive polymer layer 14 as described above, movement of the anion-containing solution impregnated in first conductive polymer layer 14 to second conductive polymer layer 21 can be suppressed. Therefore, the anion-containing solution can be kept in first conductive polymer layer 14 located nearer dielectric coating 13. Therefore, the function of repairing dielectric coating 13 by the Pf anion can be achieved more efficiently.

The high-boiling-point organic solvent is stably present in first conductive polymer layer 14. Therefore, even when the solid electrolytic capacitor is mounted on the circuit board by soldering, for example, the Pf anion can be stably present in first conductive polymer layer 14. Therefore, the solid electrolytic capacitor according to the second embodiment can maintain a sufficiently high performance even after mounting.

The solid electrolytic capacitor according to the present invention is not limited to the solid electrolytic capacitors according to the first and second embodiments as described above, and can be applied to known shapes. The known shapes include, for example, a wound-type solid electrolytic capacitor, a stacked-type solid electrolytic capacitor using a valve metal plate, or the like.

In particular, the conductive polymer layer that is formed on the anode body formed of the sintered compact has excellent capability to retain the anion-containing solution. Therefore, the present invention is more suitably applicable to the solid electrolytic capacitor having the anode body formed of the sintered compact.

EXAMPLE

The present invention will be described hereinafter in more detail with reference to examples, although the present invention is not limited thereto.

Example 1

A solid electrolytic capacitor having the structure shown in FIG. 4 was fabricated in the present example. A specific method for manufacturing the solid electrolytic capacitor will be described hereinafter.

(Formation of Anode Body)

First, tantalum powder was prepared. The tantalum powder was molded into a rectangular parallelepiped, with one end side of an anode lead of rod-shaped tantalum in the longitudinal direction buried into the tantalum powder. Then, this molded body was sintered to form a porous anode body having one end of the anode lead embedded therein. At this time, the anode body had a height of 4.5 mm, a width of 3.5 mm and a depth of 2.5 mm.

(Formation of Dielectric Coating)

Next, the anode body was soaked in a phosphoric acid solution and a voltage of 30 V was applied to the anode body through the anode lead. As a result, a dielectric coating made of $Ta_2O_5$ was formed on a surface of the anode body.

(Formation of First Conductive Polymer Layer)

Next, a first conductive polymer layer was formed on the dielectric coating using the chemical polymerization method. Specifically, an ethanol solution including pyrrole at a concentration of 3 mol/L and an aqueous solution including ammonium persulfate and paratoluenesulfonic acid were first prepared. Then, the anode body having the dielectric coating formed thereon was soaked for five minutes in the ethanol solution adjusted to 25° C. As a result, pyrrole, which is a precursor monomer of the first conductive polymer layer, was adhered to the dielectric coating. Thereafter, the anode body was pulled out of the ethanol solution, and subsequently, the anode body was soaked for five minutes in the aqueous solution set to 25° C. Then, the anode body was pulled out of the aqueous solution and left at room temperature for 10 minutes or longer for drying. Through this process, the first conductive polymer layer was formed on the dielectric coating.

(Impregnation with Anion-Containing Solution)

Next, the first conductive polymer layer was impregnated with an anion-containing solution. Specifically, first, bis(trifluoromethanesulfonyl)imide lithium (referred to as "TFSI" hereinafter) expressed by a chemical formula (2) below was prepared as a salt including a Pf anion, and triethylene glycol butyl methyl ether was prepared as a high-boiling-point organic solvent. It is to be noted that TFSI is a salt formed of a bis(trifluoromethanesulfonyl)imide anion and a lithium cation. TFSI was added to triethylene glycol butyl methyl ether to attain a concentration of 1%, and the anion-containing solution was prepared.

(2)

Then, the anode body having the first conductive polymer layer formed thereon was soaked in the anion-containing solution for five minutes. Thereafter, the anode body was pulled out of the anion-containing solution and left at room temperature.

(Formation of Second Conductive Polymer Layer)

Next, a second conductive polymer layer was formed on the first conductive polymer layer using the electrolytic polymerization method. Specifically, first, an aqueous solution including pyrrole and alkyl naphthalene sulfonic acid was prepared as an electrolytic solution. Then, an electrolytic bath of an electrolytic polymerization device was filled with the aqueous solution, the anode body was soaked in the aqueous solution and a current of 0.5 mA was passed through the first conductive polymer layer for three hours. Through this process, the second conductive polymer layer was formed on the first conductive polymer layer.

(Formation of Cathode Layer)

After the above-mentioned process ended, the anode body was pulled out of the aqueous solution and was washed with water. Thereafter, the anode body was put into a drier set to 100° C. and was dried for 10 minutes. Then, a graphite particle suspension was applied to the anode body after drying and the anode body was dried in the atmosphere to form a carbon layer. Furthermore, a silver paste layer was formed using a solution including silver particles. Through the above-mentioned process, a capacitor element was fabricated.

(Sealing of Capacitor Element)

Then, in the capacitor element, an anode terminal made of copper was welded to the anode lead. A silver adhesive was applied to the silver paste layer to form a bonding layer, and one end of a cathode terminal made of copper was bonded to the bonding layer. Furthermore, the capacitor element was sealed with an exterior resin such that a part of the anode terminal and the cathode terminal was exposed. The anode terminal and the cathode terminal exposed from the exterior resin were bent along the exterior resin, and thereafter, aging treatment was performed.

The manufactured solid electrolytic capacitor had a rated voltage of 10 V and a rated capacitance of 330 μF. The manufactured solid electrolytic capacitor had a height of 7.3 mm, a width of 4.3 mm and a depth of 3.8 mm.

Example 2

A solid electrolytic capacitor was manufactured using a method similar to that in Example 1 except that the concentration of TFSI in the anion-containing solution was set to 5%. It is to be noted that the manufactured solid electrolytic capacitor had a rated voltage, a rated capacitance and an outline similar to those of the solid electrolytic capacitor in Example 1.

Example 3

A solid electrolytic capacitor was manufactured using a method similar to that in Example 1 except that the concentration of TFSI in the anion-containing solution was set to 10%. It is to be noted that the manufactured solid electrolytic capacitor had a rated voltage, a rated capacitance and an outline similar to those of the solid electrolytic capacitor in Example 1.

Example 4

A solid electrolytic capacitor was manufactured using a method similar to that in Example 1 except that the concentration of TFSI in the anion-containing solution was set to 20%. It is to be noted that the manufactured solid electrolytic capacitor had a rated voltage, a rated capacitance and an outline similar to those of the solid electrolytic capacitor in Example 1.

Example 5

A solid electrolytic capacitor was manufactured using a method similar to that in Example 1 except that TFSI in the anion-containing solution was saturated. It is to be noted that the manufactured solid electrolytic capacitor had a rated voltage, a rated capacitance and an outline similar to those of the solid electrolytic capacitor in Example 1.

Example 6

A solid electrolytic capacitor was manufactured using a method similar to that in Example 1 except that propylene carbonate was used as the high-boiling-point organic solvent in the anion-containing solution and the concentration of TFSI was set to 10%. It is to be noted that the manufactured solid electrolytic capacitor had a rated voltage, a rated capacitance and an outline similar to those of the solid electrolytic capacitor in Example 1.

Example 7

A solid electrolytic capacitor was manufactured using a method similar to that in Example 1 except that polyethylene glycol dimethyl ether was used as the high-boiling-point organic solvent in the anion-containing solution and the concentration of TFSI was set to 10%. It is to be noted that the manufactured solid electrolytic capacitor had a rated voltage, a rated capacitance and an outline similar to those of the solid electrolytic capacitor in Example 1.

Example 8

A solid electrolytic capacitor was manufactured using a method similar to that in Example 1 except that thiodiethanol was used as the high-boiling-point organic solvent in the anion-containing solution and the concentration of TFSI was set to 10%. It is to be noted that the manufactured solid electrolytic capacitor had a rated voltage, a rated capacitance and an outline similar to those of the solid electrolytic capacitor in Example 1.

Comparative Example 1

A solid electrolytic capacitor was manufactured using a method similar to that in Example 1 except that the step of impregnation with the anion-containing solution was not performed. It is to be noted that the manufactured solid electrolytic capacitor had a rated voltage, a rated capacitance and an outline similar to those of the solid electrolytic capacitor in Example 1.

Comparative Example 2

A solid electrolytic capacitor was manufactured using a method similar to that in Example 1 except that propylene glycol monomethyl ether (boiling point: 120° C.) was used in the anion-containing solution instead of the high-boiling-point organic solvent and the concentration of TFSI was set to 10%. It is to be noted that the manufactured solid electrolytic capacitor had a rated voltage, a rated capacitance and an outline similar to those of the solid electrolytic capacitor in Example 1.

Comparative Example 3

A solid electrolytic capacitor was manufactured using a method similar to that in Example 1 except that NaCl was used instead of TSFI and the concentration of NaCl was set to 10%. It is to be noted that the manufactured solid electrolytic capacitor had a rated voltage, a rated capacitance and an outline similar to those of the solid electrolytic capacitor in Example 1.

<Performance Evaluation>
<<Measurement of ESR>>

Twenty solid electrolytic capacitors according to each of Examples 1 to 8 and Comparative Examples 1 to 3 were randomly extracted. For each extracted solid electrolytic capacitor, the ESR (mΩ) of each solid electrolytic capacitor at a frequency of 100 kHz was measured using an LCR meter for four-terminal measurement, and an average value in the solid electrolytic capacitors according to each of Examples 1 to 8 and Comparative Examples 1 to 3 was calculated. The result was shown in "ESR (mΩ)" in Table 1.

<<Breakdown Voltage Test>>

Twenty solid electrolytic capacitors according to each of Examples 1 to 8 and Comparative Examples 1 to 3 were randomly extracted. For each extracted solid electrolytic capacitor, a breakdown voltage test was conducted while increasing an applied DC voltage at a speed of 1 V/second. An average value in the solid electrolytic capacitors according to each of Examples 1 to 8 and Comparative Examples 1 to 3 was calculated, taking a voltage when a leak current is 1 mA or more as a breakdown voltage. The result was shown in "breakdown voltage (V)" in Table 1.

<<Surge Breakdown Voltage Test>>

Twenty solid electrolytic capacitors according to each of Examples 1 to 8 and Comparative Examples 1 to 3 were randomly extracted. For each extracted solid electrolytic capacitor, a surge breakdown voltage test was conducted under the environment at 105° C., which is the maximum use temperature. Specifically, a discharge resistance of 1 kΩ was connected to each solid electrolytic capacitor, and a cycle for 6 minutes in total of discharging the solid electrolytic capacitor for 5 minutes and 30 seconds and charging the solid electrolytic capacitor for 30 seconds was repeated 1000 times. After this test ended, a leak current in each solid electrolytic capacitor was measured. When the leak current was 1 mA or more, it was determined that a failure occurred, and the number of the failure was checked. The result was shown in "number of failure" in Table 1.

TABLE 1

| | type of salt | type of organic solvent | salt concentration (%) | ESR (mΩ) | breakdown voltage (V) | number of failure |
|---|---|---|---|---|---|---|
| Example 1 | TFSI | triethylene glycol butyl methyl ether | 1 | 19 | 20.9 | 2 |
| Example 2 | TFSI | triethylene glycol butyl methyl ether | 5 | 19 | 24.1 | 0 |
| Example 3 | TFSI | triethylene glycol butyl methyl ether | 10 | 19 | 25.5 | 0 |
| Example 4 | TFSI | triethylene glycol butyl methyl ether | 20 | 20 | 25.3 | 0 |
| Example 5 | TFSI | triethylene glycol butyl methyl ether | saturation | 22 | 25.3 | 0 |
| Example 6 | TFSI | propylene carbonate | 10 | 19 | 24.6 | 0 |
| Example 7 | TFSI | polyethylene glycol dimethyl ether | 10 | 19 | 25.1 | 0 |
| Example 8 | TFSI | thiodiethanol | 10 | 19 | 26.2 | 0 |

TABLE 1-continued

| | type of salt | type of organic solvent | salt concentration (%) | ESR (mΩ) | breakdown voltage (V) | number of failure |
|---|---|---|---|---|---|---|
| Comparative Example 1 | — | — | — | 19 | 20.5 | 4 |
| Comparative Example 2 | TFSI | propylene glycol monomethyl ether | 10 | 20 | 19.8 | 3 |
| Comparative Example 3 | NaCl | triethylene glycol butyl methyl ether | 10 | 22 | 19.5 | 4 |

Referring to Table 1, the ESR in each of Examples 1 to 8 in which impregnation with the anion-containing solution including TFSI was performed was identical with or increased only slightly as compared with the ESR in Comparative Example 1 in which impregnation with the anion-containing solution was not performed, and it was found that the ESR could be kept low. It was found that the ESR could be kept sufficiently low particularly when the concentration of TFSI in the anion-containing solution was 20% or lower. It was also found that in Examples 1 to 8, an effect of suppressing an increase in the ESR was obtained even when the type of the high-boiling-point organic solvent was changed.

The breakdown voltage in each of Examples 1 to 8 was higher than the breakdown voltage in each of Comparative Examples 1 to 3. The breakdown voltage was high particularly when the concentration of TFSI in the anion-containing solution was 5% or higher. Furthermore, after the surge breakdown voltage test, a failure occurred in two out of the twenty solid electrolytic capacitors in Example 1, although the number of failure was smaller as compared with Comparative Examples 1 to 3. In Examples 2 to 8, the number of failure was zero.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A solid electrolytic capacitor, comprising:
an anode body;
a dielectric coating provided on a surface of said anode body; and
a first conductive polymer layer provided on said dielectric coating, wherein an anion expressed by a chemical formula (1) below and an organic solvent having a boiling point of 240 Å° C. or higher are included in said first conductive polymer layer:

(1)

(in the chemical formula (1) above, R1 and R2 are identical with or different from each other, and represent a fluoroalkyl group);
a conductive polymer in said first conductive polymer layer is made from polythiophene or derivatives thereof, polypyrrole or derivatives thereof, polyaniline or derivatives thereof, or polyfuran or derivatives thereof, and said anion is present in said first conductive polymer layer in a state where said anion is dissolved in said organic solvent; and
a second conductive polymer layer provided on said first conductive polymer layer;
wherein said first conductive polymer layer includes more said anion than said second conductive polymer layer.

2. The solid electrolytic capacitor according to claim 1, wherein
said organic solvent is at least one type selected from the group consisting of ethylene glycol monophenyl ether, triethylene glycol monomethyl ether, triethylene glycol monoethyl ether, diethylene glycol dibutyl ether, triethylene glycol butyl methyl ether, polyethylene glycol dimethyl ether, tetraethylene glycol dimethyl ether, 2,2'-thiodiethanol, sulfolane, and polyethylene glycol monomethyl ether.

3. The solid electrolytic capacitor according to claim 1, wherein
said anion is a bis(trifluoromethanesulfonyl)imide anion.

4. The solid electrolytic capacitor according to claim 1, wherein
the concentration of said anion in said organic solvent is 5% or higher and 25% or lower.

5. The solid electrolytic capacitor according to claim 1, wherein said first conductive polymer layer has less density than said second conductive polymer layer.

6. A solid electrolytic capacitor, comprising:
an anode body;
a dielectric coating provided on a surface of said anode body;
a first conductive polymer layer provided on said dielectric coating; and
a second conductive polymer layer provided on said first conductive polymer layer, wherein
an anion expressed by a chemical formula (1) below and an organic solvent having a boiling point of 240° C. or higher are included in said first conductive polymer layer:

(1)

(in the chemical formula (1) above, $R^1$ and $R^2$ are identical with or different from each other, and represent a fluoroalkyl group), and
said first conductive polymer layer includes more said anion than said second conductive polymer layer.

7. The solid electrolytic capacitor according to claim 6, wherein
said first conductive polymer layer has less density than said second conductive polymer layer.

8. The solid electrolytic capacitor according to claim 6, wherein
said organic solvent is at least one type selected from the group consisting of ethylene glycol monophenyl ether, triethylene glycol monomethyl ether, triethylene glycol monoethyl ether, diethylene glycol dibutyl ether, triethylene glycol butyl methyl ether, polyethylene glycol dimethyl ether, tetraethylene glycol dimethyl ether, 2,2'-thiodiethanol, sulfolane, and polyethylene glycol monomethyl ether.

9. The solid electrolytic capacitor according to claim 6, wherein
said anion is a bis(trifluoromethanesulfonyl)imide anion.

10. The solid electrolytic capacitor according to claim 6, wherein
said anion is present in said first conductive polymer layer in a state where said anion is dissolved in said organic solvent.

11. The solid electrolytic capacitor according to claim 6, wherein
the concentration of said anion in said organic solvent is 5% or higher and 25% or lower.

* * * * *